Jan. 29, 1935.  H. B. JOY  1,989,452
TARGET TRAP PULLING DEVICE
Filed Feb. 14, 1933   2 Sheets-Sheet 1
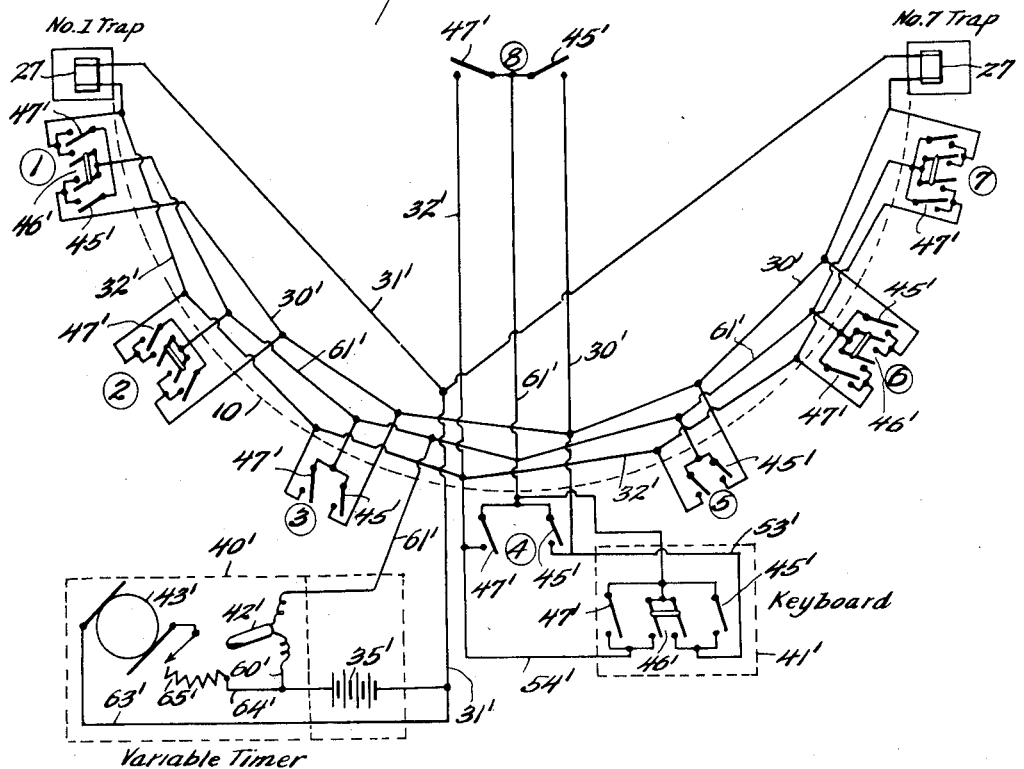
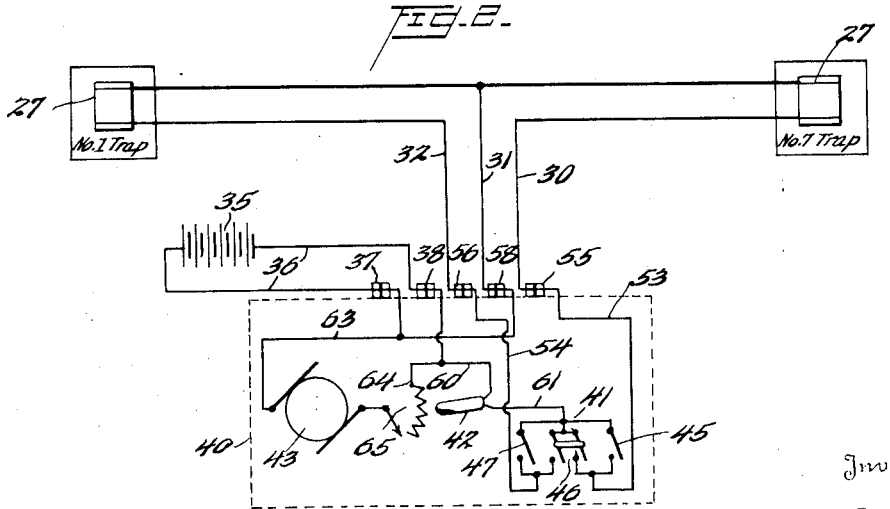
Inventor
Henry B. Joy
By Watson, Coit, Morse & Grindle
Attorney Jan. 29, 1935.  H. B. JOY  1,989,452
TARGET TRAP PULLING DEVICE
Filed Feb. 14, 1933    2 Sheets-Sheet 2
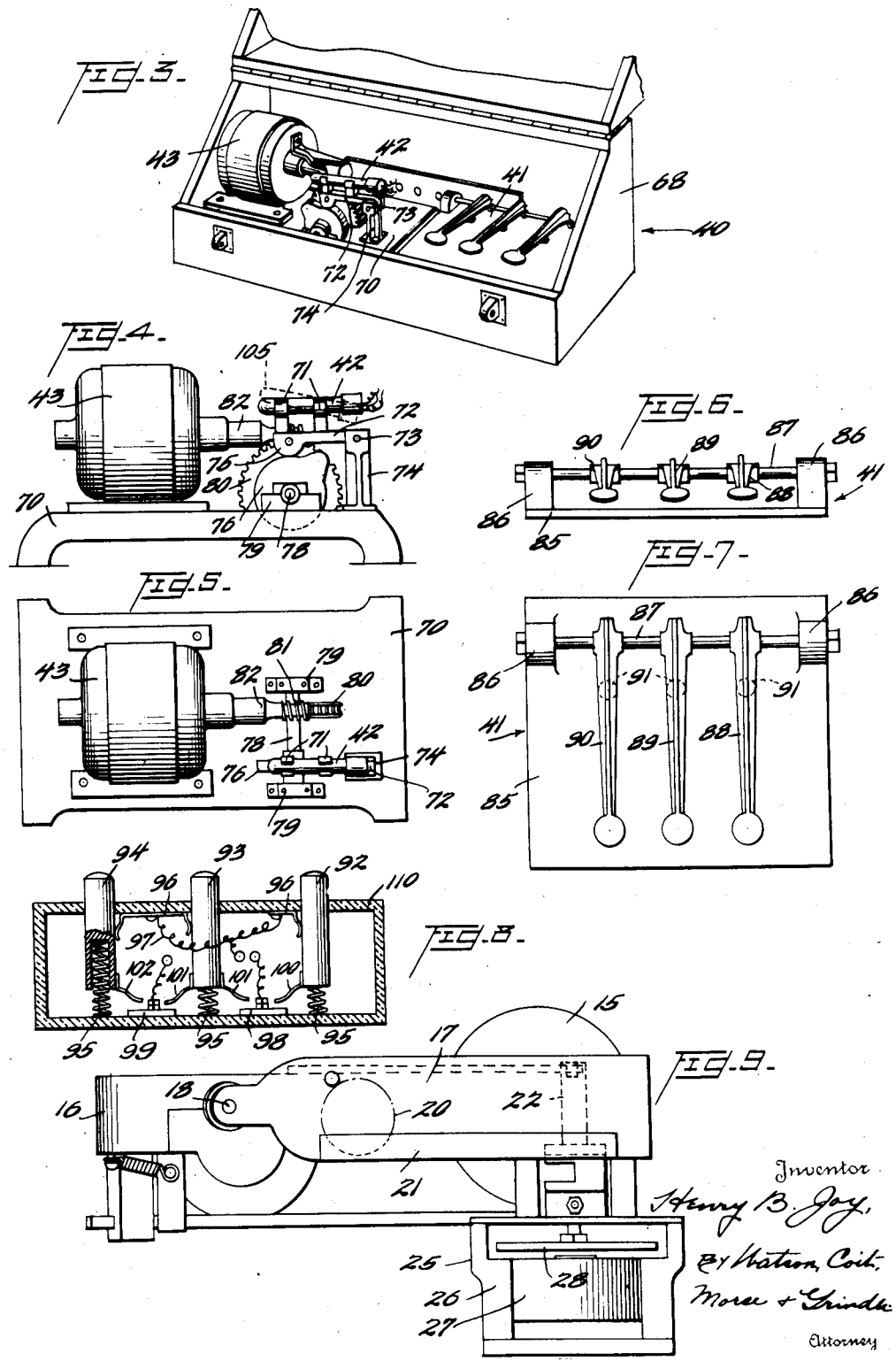

Patented Jan. 29, 1935

1,989,452

UNITED STATES PATENT OFFICE 1,989,452

TARGET TRAP PULLING DEVICE

Henry B. Joy, Grosse Pointe Farms, Mich.

Application February 14, 1933, Serial No. 656,741

4 Claims. (Cl. 124—3)

This invention relates to target trap pulling devices and has for its general object the provision of a novel and improved installation for operating the target-throwing traps at trap shooting or skeet shooting fields.

A more particular object of the invention is to introduce certain refinements in the methods and apparatus for releasing the traps which will be productive of greater sport, and which will tend to eliminate any inequality of opportunity between the contestants. Heretofore, clay pigeon and skeet traps have been operated manually by an attendant, or have been released by electrically operated means actuated by either an attendant or one of the shooters. In cases where the contestant himself operates the trap pull,—generally by means of a foot actuated mechanism of some sort,—he knows that the trap will be released immediately and is, of course, prepared to shoot at once. In cases where the traps have been operated by attendants, the criticisms of apparent favoritism by the trap pullers have been exceedingly numerous. According to the rules of the National Skeet Shooting Association, the trap must be pulled within three seconds after the signal is given by the contestant, and there is abundant opportunity for the charge of favoritism on the part of the trap puller in determining the instant of releasing the trap at any time within the three second limit fixed by the rules. Consequently, the elimination of the human element in operating the pulls, as by means of the present invention, has been greatly desired.

By means of the present invention, the pulling of the trap is automatically made to occur at an indeterminate and variable interval of time after the initial actuation of the pulling control means, whether this actuation is accomplished by the contestant or by an attendant. This indeterminately variable timing of the pull within the three second limit tends to simulate the uncertainty of field shooting and adds greatly to the sport. This novel method of controlling the pull furthermore eliminates the monotonous, rhythmic succession of "pull" signals and almost instantaneous firing, such as prevailed in the old style trap shooting, together with the almost inevitable creeping of the gun to the shoulder when the target is called for. In short, the present invention is designed to raise skeet shooting to the high level of a real sport requiring maximum skill in handling the gun, and to prevent it from degenerating into a contest involving the scoring of mere quantity of breaks.

In its broader aspects, the invention contemplates the provision of a skeet field or trap shooting field provided with one or more target throwing traps and one or more shooting stations, together with means for initiating the pulling operation sequence and means for completing the sequence at a variable interval after the first operation. In the preferred embodiment of the invention, the trap pulls and the shooting stations are connected by electrical circuits in which are disposed a suitable source of current and selectively operable switches for actuating either or both of two trap pulls. The circuit is also provided with another switch which is intermittently operated at regular intervals by means of a continuously actuated contact making device preferably driven by an electric motor. With this arrangement, it will be readily seen that upon actuating one of the first mentioned switches and retaining it in circuit closing position until the next regular periodic closing of the contact making device, the trap release will occur at an indeterminate interval after the actuation of the first switch; the duration of the interval, of course, depending upon the imminence of the next successive operation of the second switch at the instant the first switch is operated.

Other objects and features of novelty include certain variations in the field installations for different modes of operation, the provision of portable control units adapted for attachment to such permanent field installations and various other improvements which will be apparent to one skilled in the art from the following specification when read in connection with the accompanying drawings in which certain embodiments of the invention are illustrated by way of example.

In the drawings:

Figure 1 is a diagram of a skeet field, the trap pulling controls, and the associated wiring, in accordance with one embodiment of the invention;

Figure 2 is a diagram of an alternative installation;

Figure 3 is a view in perspective of a portable electric trap pull control unit for use in connection with the installation shown in Figure 2;

Figure 4 is a view in elevation of one form of variable timer;

Figure 5 is a plan view of the same;

Figure 6 is a view in elevation of the keyboard for manual control of the trap pulls;

Figure 7 is a plan view of the keyboard;

Figure 8 is a vertical cross sectional view of an illustrative form of control switch assembly adapted to be operated by either the keyboard or the shooter's foot; and Figure 9 is a plan view of a common form of target-throwing trap to which a novel electro-magnetic pull has been applied.

In Figure 1 of the drawings the lay-out of a typical skeet field is diagrammatically shown. The several shooting positions are indicated by the numerals 1 to 8 inclusive, enclosed in circles. Positions 1 to 7 are arranged in a semi-circle indicated by the line 10 which extends from No. 1 trap to No. 7 trap as clearly shown in the figure. As is well known in the art, these traps are designed to project disc-like clay targets through trajectories making various angles with the horizontal and vertical planes.

A typical target-throwing trap is illustrated in Figure 9 of the drawings. The trap is adapted to be mounted upon a suitable base 15 and comprises a frame 16 to which a throwing arm 17 is pivoted as at 18. A target 20 is placed in the position shown in Figure 9 with one edge beneath the flange 21 of the throwing arm and is projected with considerable force by the throwing arm which is actuated by a coil spring, not shown, which is placed under tension when the trap is set and is adapted to be released suddenly by the retraction of a trigger such as is indicated at 22. Ordinarily these traps are pulled by hand and the releasing trigger is provided with a cord, a lever, a chain or similar manipulative element for this purpose. For the purposes of this invention, however, the hand operated trigger mechanism is removed from the trap and there is substituted an electro-magnetic pulling attachment designated generally by the numeral 25. This attachment comprises a frame 26 within which an electro-magnet 27 is secured and which also supports the trigger 22 to one end of which is fixed an armature plate 28. It will be readily understood that when the magnet 27 is energized it will attract the armature 28 and withdraw the trigger bolt 22 and thus spring the trap. These traps are adjustable, as already indicated, to vary the elevation and direction at which the targets are thrown. It is obvious that the attachment may be applied to any type of trap, whether adapted to be set manually or automatically as a consequence of the actuation of the pulling means.

The diagram in Figure 2 illustrates the simpler arrangement of the trap pulling installation in which the traps are controlled from a single point, although the shooter may stand at any one of the eight stations designated in Figure 1. The lay-out in Figure 2 also illustrates the portable control unit which forms one feature of the present invention. The magnets 27 of the two traps are provided with the three conductors 30, 31, 32 connected as shown in Figure 2 and adapted to be permanently installed at the field. These conductors may be laid in underground conduits or installed in any other suitable manner. The terminal ends of the conductors 30, 31 and 32 are disposed in a suitable, readily accessible location.

Since very few trap shooting or skeet fields are provided at the present time with sources of 110 volt current, it is preferred to wire the installation for the use of a 6 volt storage battery such as is commonly used in motor cars. On this account the conduits 30, 31, 32 and other connections to be described should be of very low resistance, and preferably comprising No. 8 gauge copper wire. A storage battery of the type referred to is indicated in Figure 2 at 35 and may be permanently located at the field, may be carried along with the portable control unit, or may very conveniently be the battery of a nearby automobile. Suitable leads 36 connect the battery with terminals 37 and 38 provided on the portable control unit, designated generally by the numeral 40, shown diagrammatically in Figure 2 and illustrated in perspective in Figure 3. The essential elements of the control unit 40 are the keyboard 41, the periodic switch 42 and the motor 43 for causing the switch 42 to alternately make and break contact at regular intervals. The keyboard 41 preferably comprises three key operated switches 45, 46 and 47. Switch 46 is provided with two poles at one side, each of which is connected respectively to one of the corresponding poles of the switches 45 and 47 so that the effect of an actuation of switch 46 is the same as a simultaneous actuation of switches 45 and 47. These poles to which reference has been made, are respectively connected by means of the wires 53 and 54 to the terminals 55 and 56 where they may be placed in electrical contact with the permanently installed conductors 30 and 32 respectively which lead to the traps. The return wire 31 from the traps is connected to the terminal 58 which is in communication with the terminal 37 to which is attached one of the battery leads 36. The other battery connection leads into the unit through terminal 38 and by means of wire 60 to the periodic switch 42 which, in this example, comprises a mercoid switch as illustrated in other views. A conductor 61 completes the circuit from the mercoid switch 42 to the other poles of the switches 45, 46 and 47.

The motor 43 which is employed to give a periodic movement to the switch 42 is connected by means of the wires 63 and 64 to the battery posts 37, 38. The motor 43 is controlled by the rheostat switch 65 and its speed may be regulated thereby to produce the exact periodicity of the variable timer desired.

The various operative elements which have just been described broadly are illustrated in detail in Figures 3, 4, 5, 6 and 7, and the details of these elements and of their associated structures will now be described. The unit 40 may be conveniently contained in a box or casing 68 within which it may be readily transported to and from the field. The primary elements of the control unit are designated by the same numerals in these figures as are employed in the diagram of Figure 2. The periodically operated switch 42 and its motor 43 may be conveniently mounted upon a single base 70 while the keyboard 41 may be disposed beside the periodic switch assembly within the portable container. The mercoid switch 42 is mounted by means of the clips 71 upon a rocker arm 72 which is pivoted at 73 to the bracket 74 mounted upon the base 70. A boss 75 is formed on this arm 72 and is adapted to be contacted by the rotating cam 76 for raising and lowering the rocker arm 72 at regular intervals so as to make and break the contact in the switch 42. The cam 76 is mounted upon the shaft 78 which is adapted to rotate in the bearings 79. A worm wheel 80 is secured to the shaft 78 near its opposite end and is adapted to be rotated by means of the worm 81 carried by the armature shaft 82 of the motor 43.

The actuating keyboard 41, as shown in Figures 3, 6 and 7, comprises the plate 85 provided with bearing lugs 86 for the shaft 87 upon which are mounted the keys 88, 89 and 90. These keys are provided with projections or bosses 91 which are adapted to transmit the depressing movement of the keys to the switch mechanism disposed beneath the plate 85. Although any well-known variety of single and double pole switches may be employed to be actuated by the keys of the keyboard 41, one example is suggested in Figure 8 in which plungers 92, 93 and 94 are arranged to be depressed by contact with the projections 91 on the keys 88, 89 and 90. The downward movement of the plungers is resiliently resisted by the springs 95, so that the contact must be maintained by keeping the selected key depressed until the pulling operation is completed. The spring contacts 96 together with their connecting wire 97 comprise the poles of the switches which are all connected to the wire 61 in the diagram of Figure 2 and the opposite poles to which the wires 53 and 54 are connected are comprised by the contact plates 98 and 99 in the suggested practical embodiment shown in Figure 8. The plungers are provided with spring contacts 100, 101 and 102 respectively which are adapted to be pressed against the plates 98 or 99 depending upon the key selected.

The operation of the arrangement of Figure 2 involving the portable control unit will now be described. It is preferred that in this lay-out the actuation of the traps be effected by an attendant. When the portable control unit has been brought to the field and connected to the permanently installed wires by means of its terminals or binding posts, the oscillations of the switch 42 are started by closing the switch 65 whereby the motor 43 is energized. The rate of speed of the motor and the dimensions of the cam 76 and the worm gearing are so selected that the cam will make one revolution every 2½ to 2¾ seconds so as to insure that the interval will not possibly exceed the lawful three seconds prescribed by the rules. Now, if at the signal "pull" the attendant depresses key 88 so as to actuate switch 45, the circuit between No. 7 trap and the periodic switch 42 will be closed, and upon the next succeeding circuit closing actuation of the switch 42 the electro-magnet 27 of No. 7 trap will be energized and the target will be released; this latter event naturally occurring within three seconds after the depression of the switch 45 and creating an interval of delay depending upon the point in its orbit at which cam 76 is found when switch 45 is depressed. Similarly, if the key 90 is depressed the switch 47 will be closed and trap No. 1 will be sprung at the next succeeding actuation of the switch 42. Upon actuation of the switch 46 by depression of the key 89 both traps will be pulled simultaneously when the cam 76 rocks the switch 42 to complete the actuating circuit.

In order to render the variable timing accomplished by the switch 42 inoperative, the mercoid tube may be tilted within the clip 71 to a position somewhat as shown in dotted lines at 105 in Figure 4 of the drawings. This will insure that the contacts of the switch 42 will always be closed and the traps will be sprung immediately upon actuation of the keyboard. The same result may be obtained by the provision of a short-circuiting switch in parallel with the mercoid or other periodic switch employed. This expedient is also useful in the event the motor becomes temporarily out of commission.

A somewhat more elaborate installation is shown in the diagram of Figure 1 wherein the actuation of the traps may be accomplished by a contestant at any one of the eight shooting positions shown. The advantage of the system which is about to be described will be apparent when comparison is made between skeet shooting and field shooting. In the latter sport, when the dog has located a covey of quail or other game and has come to point, the hunter can usually walk up behind his pointing dog and stop without flushing the birds. At this point, one more step forward by either the dog or the hunter would usually flush the covey. In simulation of these conditions in actual field shooting, it has been suggested that the signalling for pulling the trap, even in the absence of electrical pulling arrangements, be made the taking of a forward step by the shooter.

In applying this idea to the present system of trap pulling the embodiment of the invention shown in Figure 1 was developed. In this installation, each of the firing stations 1, 2, 6 and 7 is provided with actuating switches very similar to the switches adapted to be actuated by the keyboard 41 and may very conveniently take the form shown in Figure 8 wherein the plungers 92, 93 and 94 may be actuated by treading upon them with the foot. In this case, the box or casing 110 may be disposed with its top surface level with the ground and the upper ends of the plungers 92, 93, 94 projecting slightly above the surface. A keyboard 41' is also shown in Figure 1 and may be used alternatively with the foot operated devices at the shooting stations. This keyboard may be separately installed as indicated in the diagram or it may form a part of the variable timer as in the example shown in Figure 2. If employed as a separate unit the variable timer may be arranged as shown at 40' in Figure 1, and the battery unit 35' may be separately connected or form a part of the portable mechanism as suggested before. The various parts of the wiring circuits in Figure 1 are given, so far as possible, the same numerals as the corresponding conductors in Figure 2 but with the addition of primes. It will be noted that, for variety, only stations 1, 2, 6 and 7 are wired for the shooting of "doubles" and the stations 3, 4, 5 and 8 are provided with switches 45' and 47' only for separate pulling of traps No. 1 and No. 7.

The operation of the installation of Figure 1 is substantially the same as that which has originally been described with reference to the arrangement in Figure 2. The depression by the foot of the shooter at any of the shooting stations of a selected one of the switches 45', 46' or 47' will initiate the closing of the circuit to either No. 7 trap or No. 1 trap or both of them and the circuit will be completed upon the next successive closing of the contact of the periodic switch 42'. By this arrangement, it will be seen that a trap pulling attendant will be eliminated, while the element of uncertainty as to the time of pulling will be retained even though the shooter himself initiates the pulling action.

It will thus be seen that there is provided by the present invention a very conveniently operated and easily installed electric pulling system for use in any type of trap shooting fields, and it is also understood that various changes and modifications may be made in the embodiment illustrated and described without departing from the scope of the invention as defined in the following claims.

Having thus described the invention, what is claimed as new and desired to be secured by Letters Patent is:

1. A skeet shooting installation comprising, in combination, a pair of spaced target traps, electrically operated means for releasing said traps, a series of shooting stations arranged in a semicircle, each provided with a plurality of foot operated electric switches adapted to be selectively operated by a shooter standing at said station to release a target from one or both of said traps, a source of current, an electrical circuit connecting said releasing means with said source of current, another switch disposed in said circuit in series with all of said first named switches, and means for automatically and intermittently actuating said last named switch at regular intervals, whereby an indeterminately variable delay is established between the actuation of a switch by the shooter and the release of a target or targets.

2. A skeet shooting installation comprising, in combination, a pair of spaced target traps, electrically operated means for releasing said traps, a series of shooting stations arranged in a semicircle, each provided with a plurality of foot operated electric switches adapted to be selectively operated by a shooter standing at said station to release a target from one or both of said traps, a source of current, an electrical circuit connecting said releasing means with said source of current, another switch disposed in said circuit in series with all of said first named switches, cam means for actuating said switch intermittently at regular intervals, whereby an indeterminately variable delay is established between the actuation of a switch by the shooter and release of a target or targets, an electric motor for operating said cam, a motor driving circuit connected with said source of current, a rheostat in said last named circuit for regulating the speed of said motor in order to adjust the length of said interval.

3. A skeet shooting installation comprising, in combination, a pair of spaced target traps, electrically operated means for releasing said traps, a series of shooting stations arranged in a semicircle, each provided with a plurality of foot operated electric switches adapted to be selectively operated by a shooter standing at said station to release a target from one or both of said traps, a source of current, an electrical circuit connecting said releasing means with said source of current, a mercoid switch disposed in said circuit in series with said first named switches, an oscillatable support for said mercoid switch, a rotatable cam for rocking said support, and a motor for continuously rotating said cam to oscillate said support at regular intervals, whereby an indeterminately variable delay is established between the actuation of a switch by the shooter and the release of a target or targets, means for adjustably mounting said mercoid switch on said rockable support, whereby it may be disposed in a position to open and close the circuit in response to the oscillating movement or in a position to remain closed during said oscillation so as to effect the release of a target immediately upon the actuation of one of said first named switches by the shooter.

4. A skeet shooting installation comprising, in combination, a pair of spaced target traps, electrically operated means for releasing said traps, a series of shooting stations arranged in a semicircle, each provided with a plurality of foot operated electric switches adapted to be selectively operated by a shooter standing at said station to release a target from one or both of said traps, a source of current, an electrical circuit connecting said releasing means with said source of current, another switch disposed in said circuit in series with said first named switches, a continuously operating means for actuating said last named switch at regular intervals, whereby an indeterminately variable delay is established between the actuation of a switch by the shooter and the release of a target or targets, a motor for driving said continuously operating means, supporting means for said last named switch adapted to be affected by the regular operation of said actuating means, said supporting means being adjustable whereby the switch is disposed in a position to open and close the circuit in response to the movement of said operating means, or in a position to remain closed during said movement so as to effect the release of a target immediately upon the actuation of one of said first named switches by the shooter.

HENRY B. JOY.